J. S. ARCUS.

CHECK HOLDING AND NOTCHING DEVICE.

APPLICATION FILED DEC. 1, 1917.

Reissued Jan. 14, 1919. 14,584.

Witness:
Harry S. Gaither

Inventor:
James S. Arcus
by William L. Hale,
Atty

THE NORRIS PETERS CO., PHOTO-LITHO., WASHINGTON, D. C.

UNITED STATES PATENT OFFICE.

JAMES S. ARCUS, OF CHICAGO, ILLINOIS.

CHECK HOLDING AND NOTCHING DEVICE.

14,584. Specification of Reissued Letters Patent. Reissued Jan. 14, 1919.

Original No. 1,239,861, dated September 11, 1917, Serial No. 68,792, filed December 27, 1915. Application for reissue filed December 1, 1917. Serial No. 204,994.

*To all whom it may concern:*

Be it known that I, JAMES S. ARCUS, a citizen of the United States, and a resident of Chicago, in the county of Cook and State of Illinois, have invented certain new and useful Improvements in Check Holding and Notching Devices; and I do hereby declare that the following is a full, clear, and exact description thereof, reference being had to the accompanying drawings, and to the characters of reference marked thereon, which form a part of this specification.

This invention relates to a novel holder for customers' checks such as are used in restaurants, at soda fountains and like places to check the price of the commodity or merchandise bought by the customer.

Among the objects of the invention is to provide a combined holder and price indicator so constructed and arranged as to hold a book of checks bearing numbers to indicate a series of price marks ranging from a minimum to the maximum capacity of the check, combined with means for cutting away a portion of the check opposite a desired price numeral to indicate to the cashier the valve of the check.

Other objects of the invention are to improve and simplify check holders and markers for the purpose set forth, and the invention consists in the combination and arrangement of the parts shown in the drawings and described in the specification and is pointed out in the appended claims.

In the drawings:—

Figure 1:
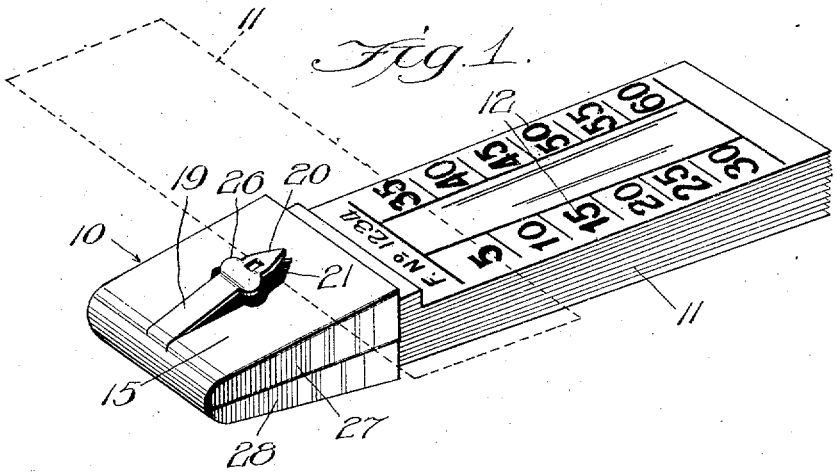
Figure 1 is a perspective view of a check holder embodying my invention with a group or book of checks therein.

As shown in the drawings 10 designates as a whole my novel check holder and 11 designates as a whole a group or book of checks, such for instance as is adapted to restaurant or lunch counter uses; said checks having two rows 12 of price indicating numerals, which price indicating numerals are printed on the main bodies of the checks. Said checks may be permanently bound together by suitable binding means in the usual manner extending through the stubs of the book of checks.

The holder 10 is herein shown and preferably is made of a single piece of spring metal,—it being made of general U-shape and comprising an upper jaw 15 and a lower jaw 16 joined by the rounded portion 17. The terminals of the upper and lower jaws are turned inwardly and are serrated to constitute the check engaging members 18, 18 of the jaws. The device thus far described constitutes a spring clamp between the engaging members 18, of which, the stub ends of the checks are clamped, the holder being held engaged with the book of checks by its own resiliency.

Figure 2:
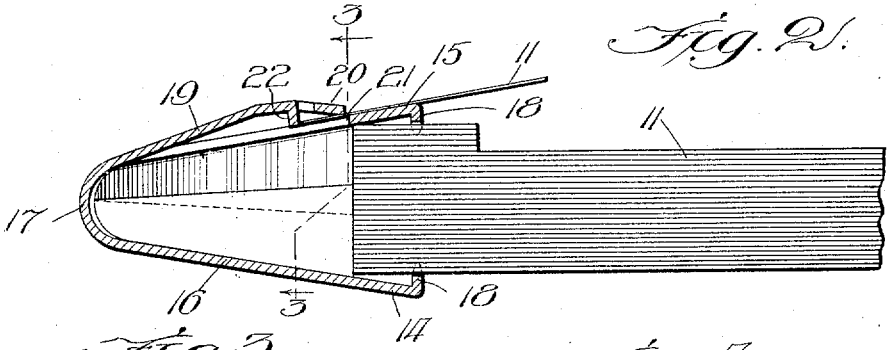
Fig. 2 is an enlarged longitudinal section of the holder showing only a portion of the book or group of checks.

The upper jaw 15 of the holder is provided with a tongue 19 which is partially severed from said jaw and constitutes an integral part thereof as more clearly indicated in Fig. 1. The said tongue is provided with a pointed end 20, preferably having sharpened converging edges and said sharpened edges coöperate with the edges 21 of the V-shaped notch in the upper jaw from which the tongue is cut to constitute a shearing device by which the checks are cut to provide price indicating notches as hereinafter described. The shearing action is given to the tongue 19 by curving the terminal portion 20 relatively to the general plane of the upper jaw, as best indicated in Fig. 2, so that the extreme point of the tongue is first brought into coöperative relation with the coacting edges of the V-shaped notch 21,—the cutting edges of the rear portion of the tongue, when the tongue is pressed downwardly into the space of the upper jaw from which it was cut, being brought successively into action from the extreme point to the rear portions of said inclined edges. By reason of this construction the coacting action of the pointed tongue and notch is that of a shear as distinguished from that of a punch. The said tongue is provided just in rear of its point with a gage stop 22, shown in Fig. 2 as formed by bending a portion of the material of the tongue downwardly.

Figure 3:
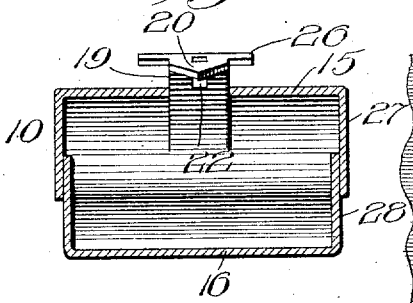
Fig. 3 is a transverse section on the line 3—3 of Fig. 2.
Figure 4:
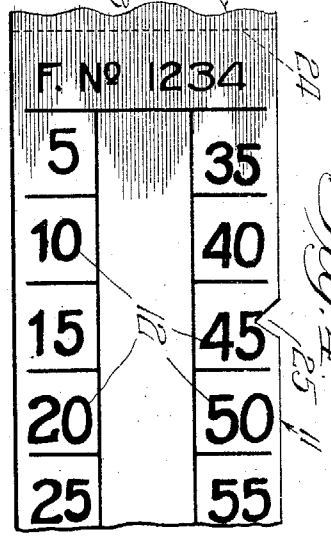
Fig. 4 is a partial view of one of the checks showing the manner in which the price numerals are indicated.

The use of the device is illustrated in Figs. 1 and 2. When a check of a certain denomination is to be given to a customer, the waiter tears the check from its stub along the usual perforated or weakened line 24, and inserts the detached check between the upper jaw 15 and the shearing tongue 19, with the price numeral representing the charge to be made in line with or opposite to said pointed shearing tongue. The tongue is thereafter pressed downwardly and the shearing action of the pointed tongue in coöperation with the V-shaped notch of the upper jaw serves to cut away a portion of the check to produce the notch designated by 25 in Fig. 4 and to thus indicate the value of the check. The said gage stop 22 limits the extent of the insertion of the check into the shearing device and said stop is so related to the shearing point of the tongue that the notch produced by the shearing action of the tongue does not extend beyond that part of the area bearing the price numeral. Preferably and in order to afford an ample bearing for the thumb against the shearing tongue 19, said shearing tongue is formed in rear of the gage stop 22 with a widened portion 26 constituting a thumb piece or button, as most clearly indicated in Figs. 1 and 3.

In some uses of the device it is objectionable to have the cut pieces of the checks fall about, and in such uses it may be desirable to provide a receptacle to receive the cut out pieces so as to prevent them falling in objectionable places. This may be effected by providing the upper and lower jaws 15, 16, respectively, with end pieces 27, 28 respectively, one of which is adapted to overlap the other in the manner indicated in Figs. 1 and 3. The said end pieces are made integral parts of the jaws and are formed therefrom in such a manner as not to interfere with the spring action of the jaws, as will be more clearly apparent from an inspection of Fig. 2. When the holder is thus arranged to constitute a receptacle, the triangular pieces cut from the tickets to produce the notches 25 fall thereinto and said receptacle will be made sufficiently large to receive all of the cut out pieces from one book of tickets; the cut out pieces or fragments being emptied from the receptacle when one book of tickets is changed for another.

It will be noted that the notching tongue is located on the front side of the device, or on that side on which the group of checks or sales slips are supported, so that when the waiter tears a check from the group the margin of the check to be notched may be presented directly to the notching device or between the free end of the notching tongue and the member of the device over which it is spaced, without the necessity of turning the device about such as would be true if the notching device were located on the back of the device. So far as this feature of the invention is concerned the notching device may be otherwise located with respect to the location of the resilient clamp.

It will be understood that the structural details herein described are capable of some variation within the spirit and scope of the claims hereto attached and that the invention is not limited to the structure shown except as the same is hereafter made the subject of specific claims. For instance, the notching device itself may be adapted to uses where the check or sales slip holding device is not required.

What I claim as my invention is:

1. A check holding and notching device comprising a one piece resilient clamp adapted to receive and hold a book of checks and provided on its front side with an integral notching device which overlies the front face of the device.

2. A check holding and notching device comprising a one piece resilient clamp adapted to receive and hold a book of checks, said device being cut away to provide an integral, pointed notch forming tongue, the free end of which is raised from the front face of the device to afford between said free end of the tongue and said front face a space to receive the margin of a check.

3. A check holding and notching device comprising a one piece resilient clamp adapted to receive and hold a book of checks and provided on its front side with an integral notching device which overlies the front face of the device, there being a stop integral with said device to limit the insertion of the check into said space.

4. A check holding and notching device comprising a resilient clamp adapted to receive and hold the stub of a book of checks, and inclosed to provide a receptacle for cuttings, and a shearing device carried by the clamp and receptacle in rear of the clamping edges of the device and in position to discharge cuttings into said receptacle.

5. A check holding and notching device comprising a one piece resilient clamp and cuttings receptacle adapted to engage over one end of a book of checks and a shearing member associated with one member of said clamp and movable toward a shearing edge of said member.

6. A check holding and notching device comprising a one piece resilient clamp and cuttings receptacle adapted to engage over one end of a book of checks, a shearing member integral with said clamp and receptacle, and a gage stop to limit the insertion of a check beneath said shearing member.

7. A check holding and notching device comprising a clamp provided in rear of its clamping edges with a shearing edge, said clamp adapted to engage at its clamping edges over one end of a book of checks and a tongue integral with and struck up from said clamp and provided with a pointed shearing edge adapted to coöperate with said shearing edge.

8. A check holding and notching device comprising a U shaped clamp having in rear of its clamping edges a shearing edge, said clamp adapted to engage at its clamping edges over one end of a book of checks, a tongue integral with and struck up from said clamp and provided with a pointed shearing edge adapted to coöperate with said shearing edge, said tongue being provided in rear of its pointed end with an integral gage stop to limit the insertion of the check between the tongue and said clamp.

9. A check holding and notching device comprising a one piece U shaped resilient holder, the free edges of which are turned in and serrated to engage one end of a book of checks, one of the members of said holder being cut away to provide a tongue which is pointed at its free end and is provided with shearing edges, the body being provided with complemental shearing edges, and said tongue being provided with a gage stop to limit the insertion of a check between the tongue and said holder.

10. A check holding and notching device comprising a resilient clamp adapted to engage over one end of a book of checks and a tongue provided with a pointed shearing edge adapted to engage a complemental shearing edge on the holder, the pointed shearing edge of the tongue being disposed at an oblique angle to the shearing edge of the holder.

11. A check holding device comprising a holder provided with clamping members to engage a book of checks, one of the members being provided with an opening and at the sides of said opening with shearing edges, and provided also with a cutting tongue to coöperate with said edges and the clamping members being shaped to provide a receptacle to receive the punchings cut away from the checks.

In testimony whereof I affix my signature in the presence of two witnesses this 19th day of November, 1917.

JAMES S. ARCUS.

Witnesses:
WILLIAM L. HALL,
MARGARET D. ROBB.

Copies of this patent may be obtained for five cents each, by addressing the "Commissioner of Patents, Washington, D. C."